United States Patent
Wang

(10) Patent No.: US 9,762,118 B2
(45) Date of Patent: Sep. 12, 2017

(54) LOSSLESS SNUBBER CIRCUIT AND OPERATION METHOD THEREOF

(71) Applicant: Emerson Network Power, Energy Systems, North America, Inc., Warrenville, IL (US)

(72) Inventor: Meng Wang, Xi'an (CN)

(73) Assignee: VERTIV ENERGY SYSTEMS, INC., Lombard, IL (US)

( * ) Notice: Subject to any disclaimer, the term of this patent is extended or adjusted under 35 U.S.C. 154(b) by 258 days.

(21) Appl. No.: 13/957,835

(22) Filed: Aug. 2, 2013

(65) Prior Publication Data

US 2015/0036253 A1 Feb. 5, 2015

(51) Int. Cl.
  *H02H 3/20* (2006.01)
  *H02M 1/34* (2007.01)
  *H02M 7/155* (2006.01)

(52) U.S. Cl.
  CPC .............. *H02M 1/34* (2013.01); *H02M 7/155* (2013.01); *H02M 2001/348* (2013.01)

(58) Field of Classification Search
  USPC ........................................................ 361/91.7
  See application file for complete search history.

(56) References Cited

U.S. PATENT DOCUMENTS

| | | | | |
|---|---|---|---|---|
| 4,697,230 A * | 9/1987 | Neft | ............................. | 363/163 |
| 5,077,651 A * | 12/1991 | Kobayashi et al. | ....... | 363/56.05 |
| 5,117,167 A * | 5/1992 | Kazmirski | ............... | 318/400.22 |
| 2006/0072259 A1* | 4/2006 | Yunus | ..................... | H02M 1/34 361/56 |
| 2008/0043500 A1* | 2/2008 | Asano et al. | .............. | 363/56.12 |
| 2013/0063070 A1* | 3/2013 | Zhang et al. | ................. | 318/729 |
| 2013/0083571 A1* | 4/2013 | Pu | ........................ | H02M 1/126 363/44 |

OTHER PUBLICATIONS

Zach et al., "New Lossless Turn-on and Turn-Off (Snubber) Networks for Inverters, Including Circuits for Blocking Voltage Limitation," IEEE Transactions on Power Electronics, Vo. PE-1, No. 2, Apr. 1986.*

* cited by examiner

*Primary Examiner* — Ronald W Leja
(74) *Attorney, Agent, or Firm* — Harness, Dickey & Pierce, P.L.C.

(57) ABSTRACT

The present invention discloses a lossless snubber circuit and an operation method thereof. The lossless snubber circuit includes a first snubber circuit. The first snubber circuit includes a first diode (D7) and a capacitor (C3). The capacitance of the capacitor (C3) is big enough so that a voltage spike generated at the moment when a switch transistor (Q1) is turned off is depressed by charging the capacitor (C3). When the switch transistor (Q1) is on, the electric charges released by the capacitor (C3) are directed to a first capacitor (C1) in a three-phase Vienna structure, so as to avoid the problem of voltage stress difference caused by the large quantity of electric charges released by the capacitor (C3) flowing back to the switch transistor (Q1).

19 Claims, 6 Drawing Sheets

LOSSLESS SNUBBER CIRCUIT AND OPERATION METHOD THEREOF

FIELD OF THE INVENTION

The present invention generally relates to the field of wireless communication, and particularly to a lossless snubber circuit and an operation method thereof.

BACKGROUND OF THE INVENTION

In electrical field, there is an ideal topology circuit structure, i.e. the three-phase Vienna structure. Circuits of such structure have advantages such as small input current ripple, less device requirements, simple control and low cost, and thus are widely applied in the case of three-phase alternating current high power input.

A circuit diagram of the three-phase Vienna circuit structure is shown in FIG. 1. The circuit has circuits for three phases. The connection structure of the circuit for one phase is: a inductor L1 is connected to the anode of a diode D1 and connected to the cathode of a diode D4; the cathode of the diode D1 is connected to the positive electrode of a capacitor C1; the anode of the diode D4 is connected to the negative electrode of a capacitor C2; the negative electrode of the capacitor C1 is connected to the positive electrode of the capacitor C2; a connection point connecting the inductor L1, the anode of the diode D1 and the cathode of the diode D4 is connected to the drain of a switch transistor Q1; the source of the transistor Q1 is connected to the connection point of the capacitor C1 and the capacitor C2.

The devices in each of circuits for the other two phases of the three-phase Vienna circuit structure are connected in a way the same as that in the above mentioned circuit for the one phase.

In the circuit of the above-mentioned topology structure, the voltage difference between the source and the drain of the switch transistor Q1 is large. Moreover, in practical application of the circuit of such topology structure, the drain of the switch transistor Q1 is connected to each of the anode of the diode D1 and the cathode of the diode the D4 by a long wire, leading to parasitic inductance existing between the drain of the switch transistor Q1 and the anode of the diode D1 and between the drain of the switch transistor Q1 and the cathode of the diode D4. Therefore a very high voltage spike may be generated at the moment when the switching diode Q1 is turned off.

In order to avoid the problem of the very large voltage spike generated at the moment when the switching diode Q1 is turned off, generally an inductor R1 and a capacitor C3 are connected between the drain and the source of the switch transistor Q1. The inductor R1 and the capacitor C3 are connected in series with each other and then connected in parallel to the switch transistor Q1. This kind of circuit is generally referred to as a RC snubber circuit. In the operation of the circuit, when the switch transistor Q1 is turned off, the voltage spike generated at that moment charges the capacitor C3; when the switch transistor Q1 is turned on, the capacitor C3 discharges and electric charges released are consumed by the inductor R1.

The snubber circuit of such RC structure still has the following disadvantages.

In the case where the capacitance of the capacitor C3 is small, while the voltage spike generated at the moment when the switch transistor Q1 is turned off is too large, the RC snubber circuit can not efficiently depress the voltage spike.

In the case where the capacitance of the capacitor C3 is large enough, a large voltage spike generated at the moment when the switch transistor Q1 is turned off may be absorbed by the capacitor C3. However, when the switch transistor Q1 is turned on again, the capacitor C3 discharges. At this point, since the capacitance of the capacitor C3 is large enough, the quantity of the electric charges released by the capacitor C3 is large. If the released electric charges cannot be consumed by the inductor R1, the residual electric charges may influence the output junction capacitance of the switch transistor Q1, increase the loss of the switch transistor, and affect the efficiency of the entire circuit.

Therefore, it can be seen that, in the existing RC snubber circuit, the problems of effective depression to the voltage spike generated when the switch transistor Q1 is turned off and the voltage stress difference when the switch transistor Q1 is turned on cannot be solved simultaneously.

SUMMARY OF THE INVENTION

The invention provides a lossless snubber circuit and an operation method thereof, so as to simultaneously solve the problems of effective depression to the voltage spike generated when the switch transistor Q1 is turned off and the voltage stress difference when the switch transistor Q1 is turned on.

A lossless snubber circuit connected to a circuit for one phase of a three-phase Vienna structure includes a first snubber circuit, wherein the anode of a first diode (D7) in the first snubber circuit is connected to the drain of a switch transistor (Q1), and one terminal of a capacitor (C3) in the first snubber circuit is connected to the source of the switch transistor (Q1); and the cathode of the first diode (D7) in the first snubber circuit is connected to the other terminal of the capacitor (C3) in the first snubber circuit, the connection point between the cathode of the first diode (D7) in the first snubber circuit and the capacitor (C3) in the first snubber circuit is connected to the positive electrode of a first capacitor (C1) in the three-phase Vienna structure.

An operation method of a lossless snubber circuit includes:

in the case where an input voltage is a forward voltage and the anode of a first diode (D7) in a first snubber circuit is connected to the drain of a switch transistor (Q1), if the switch transistor (Q1) is in a off state and the first diode (D7) in the first snubber circuit is on, then a capacitor (C3) in the first snubber circuit is charged; and if the switch transistor (Q1) is in on state and the first diode (D7) in the first snubber circuit is off, then electric charges released by the capacitor (C3) in the first snubber circuit flow to a first capacitor (C1) in a three-phase Vienna structure.

The invention has the following advantages.

In the embodiment of the invention, the capacitance of the capacitor C3 is big enough so that a voltage spike generated at the moment when the switch transistor Q1 is turned off can be efficiently depressed. Moreover, when the switch transistor Q1 is turned on, the electric charges released by the capacitor C3 are directed to the first capacitor C1 in the three-phase Vienna structure, so as to avoid the problem of voltage stress difference caused by the large quantity of electric charges released by the capacitor C3 flowing back to the switch transistor Q1, and to reduce the power consumption of devices in the entire circuit.

DETAILED DESCRIPTION OF THE INVENTION

In order to achieve the object of the invention, embodiments of the invention provide a lossless snubber circuit and an operation method thereof. The lossless snubber circuit is applied to a circuit for each phase of a three-phase Vienna circuit structure and includes a first snubber circuit. The anode of a first diode D7 in the first snubber circuit is connected to the drain of a switch transistor Q1, and one terminal of a capacitor C3 in the first snubber circuit is connected to the source of the switch transistor Q1.

The cathode of the first diode D7 in the first snubber circuit is connected to the other terminal of the capacitor C3 in the first snubber circuit, the connection point between the cathode of the first diode D7 in the first snubber circuit and the capacitor C3 in the first snubber circuit is connected to the positive electrode of a first capacitor C1 in the three-phase Vienna structure.

As compared with the prior art, the capacitance of the capacitor C3 is big enough so that a voltage spike generated at the moment when the switch transistor Q1 is turned off can be efficiently depressed. Moreover, when the switch transistor Q1 is turned on, the electric charges released by the capacitor C3 are directed to the first capacitor C1, so as to avoid the problem of the voltage stress difference caused when the large quantity of electric charges released by the capacitor C3 flowing back to the switch transistor Q1, and to reduce the power consumption of devices in the entire circuit.

In the following, the embodiments of the present invention will be described in detail in conjunction with the accompanying drawings.

First Embodiment

Figure 1:
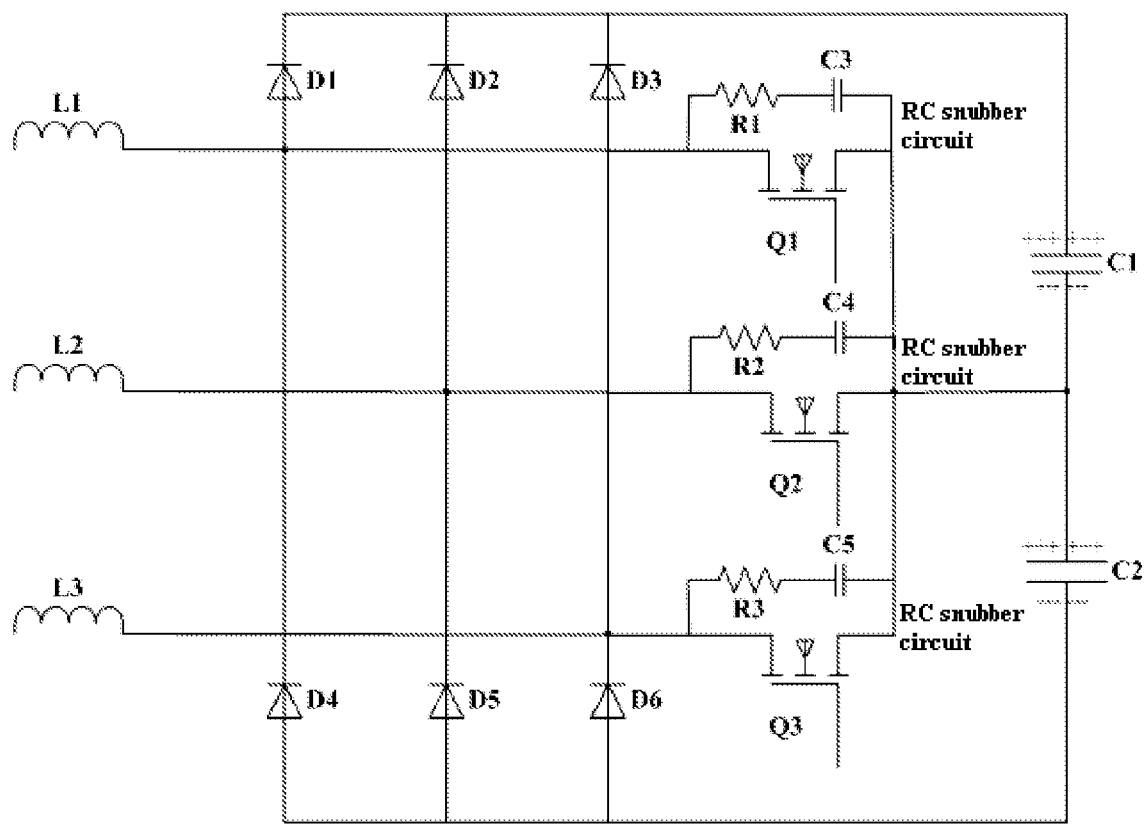
FIG. 1 is a circuit diagram of a three-phase Vienna structure in the prior art.
Figure 2A:
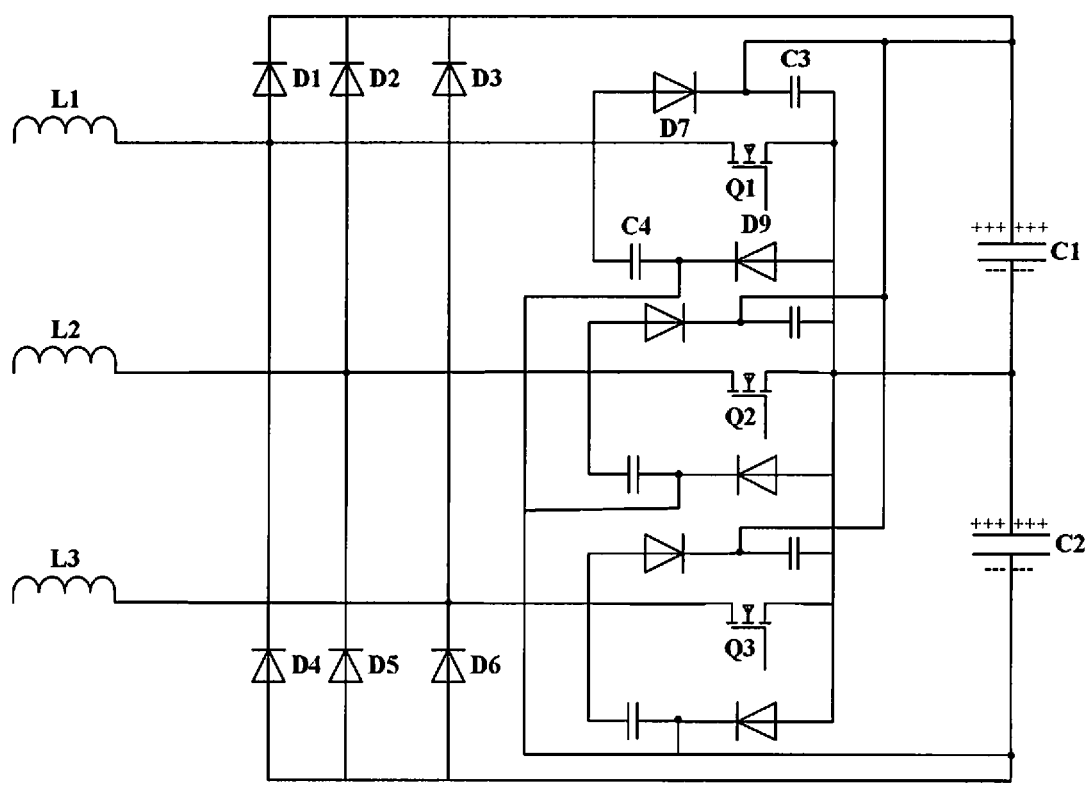
FIG. 2(a) is a structural schematic view of a lossless snubber circuit according to a first embodiment of the invention.

FIG. 2(a) is a structural schematic view of a lossless snubber circuit according to a first embodiment of the invention. As shown in FIG. 2(a), the lossless snubber circuit is applied to a circuit for each phase of a three-phase Vienna circuit structure and includes a first snubber circuit. The first snubber circuit includes a first diode D7 and a capacitor C3.

The anode of the first diode D7 in the first snubber circuit is connected to the drain of a switch transistor Q1, and one terminal of the capacitor C3 in the first snubber circuit is connected to the source of the switch transistor Q1.

The cathode of the first diode D7 in the first snubber circuit is connected to the other terminal of the capacitor C3 in the first snubber circuit, the connection point between the cathode of the first diode D7 in the first snubber circuit and the capacitor C3 in the first snubber circuit is connected to the positive electrode of a first capacitor C1 in the three-phase Vienna structure.

Preferably, the lossless snubber circuit further includes a second snubber circuit. The second snubber circuit includes a first diode D9 and a capacitor C4.

The anode of the first diode D9 in the second snubber circuit is connected to the source of the switch transistor Q1, and one terminal of the capacitor C4 in the second snubber circuit is connected to the drain of the switch transistor Q1.

The other terminal of the capacitor C4 in the second snubber circuit is connected to the cathode of the first diode D9 in the second snubber circuit, the terminal of the capacitor C4 in the second snubber circuit which is connected to the cathode of the first diode D9 in the second snubber circuit is connected to the negative electrode of a second capacitor C2 in the three-phase Vienna structure, and the positive electrode of the second capacitor C2 in the three-phase Vienna structure is connected to the negative electrode of the first capacitor C1 in the three-phase Vienna structure.

Specifically, in the case where the anode of the first diode D7 in the first snubber circuit is connected to the drain of the switch transistor Q1, the cathode of the first diode D7 in the first snubber circuit is connected to one terminal of the capacitor C3 in the first snubber circuit, and the other terminal of the capacitor C3 in the first snubber circuit is connected to the source of the switch transistor Q1, the anode of the first diode D9 in the second snubber circuit is connected to the source of the switch transistor Q1, the cathode of the diode D9 in the second snubber circuit is connected to one terminal of the capacitor C4 in the second snubber circuit, and the other terminal of the capacitor C4 in the second snubber circuit is connected to the drain of the switch transistor Q1.

In this case, the connection point between the cathode of the first diode D7 in the first snubber circuit and one terminal of the capacitor C3 in the first snubber circuit is connected to the positive electrode of the first capacitor C1 in the three-phase Vienna structure; and the connection point between the cathode of the first diode D9 in the second snubber circuit and one terminal of the capacitor C4 in the second snubber circuit is connected to the negative electrode of the second capacitor C2 in the three-phase Vienna structure.

Figure 2B:
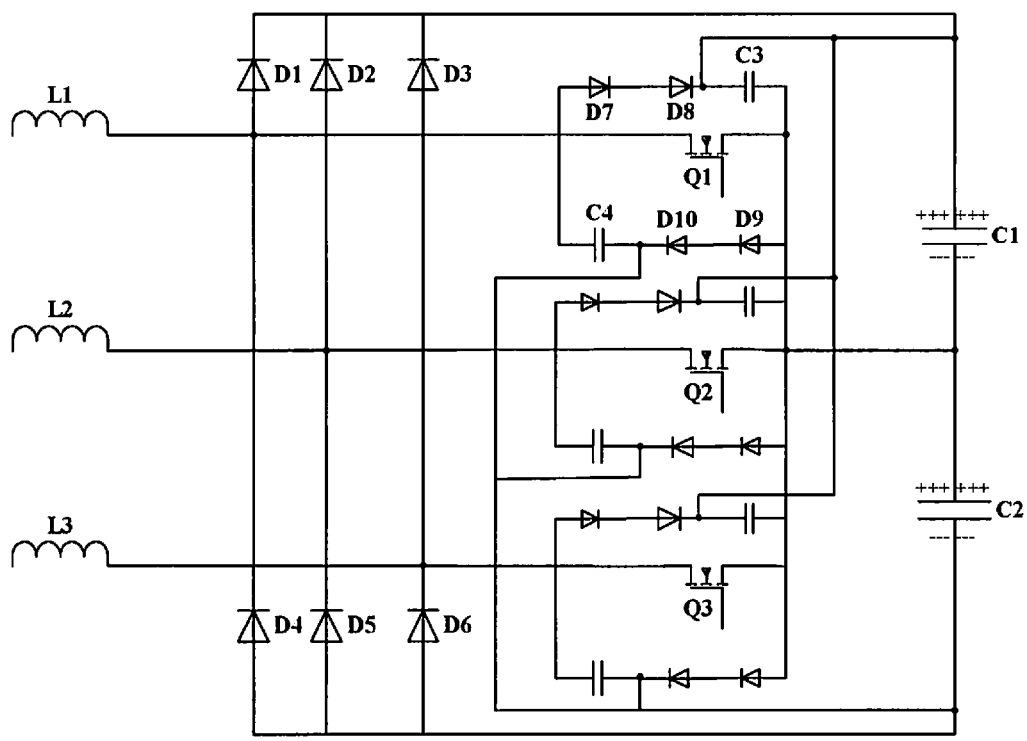
FIG. 2(b) is a structural schematic view of a lossless snubber circuit.

FIG. 2(b) is a structural schematic view of a preferable lossless snubber circuit. As shown in FIG. 2(b), the lossless snubber circuit is applied to a circuit for each phase of a three-phase Vienna circuit structure. On the basis of the lossless snubber circuit shown in FIG. 2(a), the first snubber circuit herein further includes a second diode D8 in the first snubber circuit. The second diode D8 in the first snubber circuit and the first diode D7 in the first snubber circuit are connected in series and have the same forward direction, and the second diode D8 is connected in the first snubber circuit at a position between the drain of the switch transistor Q1 and the connection point between the first diode D7 in the first snubber circuit and the capacitor C3 in the first snubber circuit.

Preferably, the second snubber circuit further comprises a second diode D10 in the second snubber circuit.

The second diode D10 in the second snubber circuit and the first diode D9 in the second snubber circuit are connected in series and have the same forward direction, and the second diode D10 is connected in the second snubber circuit at a position between the source of the switch transistor Q1 and the connection point between the first diode D9 in the second snubber circuit and the capacitor C4 in the second snubber circuit.

Specifically, in the case where the anode of the first diode D7 in the first snubber circuit is connected to the drain of the switch transistor Q1, the cathode of the first diode D7 in the first snubber circuit is connected to the anode of the second diode D8 in the first snubber circuit, the cathode of the second diode D8 in the first snubber circuit is connected to one terminal of the capacitor C3 in the first snubber circuit, and the other terminal of the capacitor C3 in the first snubber circuit is connected to the source of the switch transistor Q1, the anode of the first diode D9 in the second snubber circuit is connected to the source of the switch transistor Q1, the cathode of the first diode D9 in the second snubber circuit is connected to the anode of the second diode D10 in the second snubber circuit, the cathode of the second diode D10 in the second snubber circuit is connected to one terminal of the capacitor C4 in the second snubber circuit, and the other terminal of the capacitor C4 in the second snubber circuit is connected to the drain of the switch transistor Q1.

In this case, the connection point between the cathode of the second diode D8 in the first snubber circuit and one terminal of the capacitor C3 in the first snubber circuit is connected to the positive electrode of the first capacitor C1 in the three-phase Vienna structure; and the connection point between the cathode of the second diode D10 in the second snubber circuit and one terminal of the capacitor C4 in the second snubber circuit is connected to the negative electrode of the second capacitor C2 in the three-phase Vienna structure.

The lossless snubber circuit may include the first snubber circuit and/or the second snubber circuit. In all the cases, the number of diodes in the first snubber circuit and the number of diodes in the second snubber circuit are variable, which can be determined as required and are not limited to the case illustrated in the first embodiment.

In the embodiment, the capacitor C3 and the capacitor C4 connected in the lossless snubber circuit should be non-polarized capacitors, such as a chip capacitor or the like, but not limited thereto.

The switch transistors in circuits for the other two phases of the three-phase Vienna structure are both provided with the above-mentioned lossless snubber circuits. The connection relations are the same as above and will not be further described in detail.

Second Embodiment

The second embodiment of the invention provides an operation method for a lossless snubber circuit which includes the following.

First Case

The lossless snubber circuit includes a first snubber circuit. The first snubber circuit includes a first diode D7 and a capacitor C3 which are connected in a way as that of the first snubber circuit shown in FIG. 2(a).

The capacitance of the capacitor C3 is smaller than the capacitance of the first capacitor C1 in the three-phase Vienna structure.

The capacitance of the capacitor C3 in the first snubber circuit may be determined according to the voltage spike generated at the moment when the switch transistor Q1 is turned off, or may be determined as required, which is not limited thereto.

Figure 3:
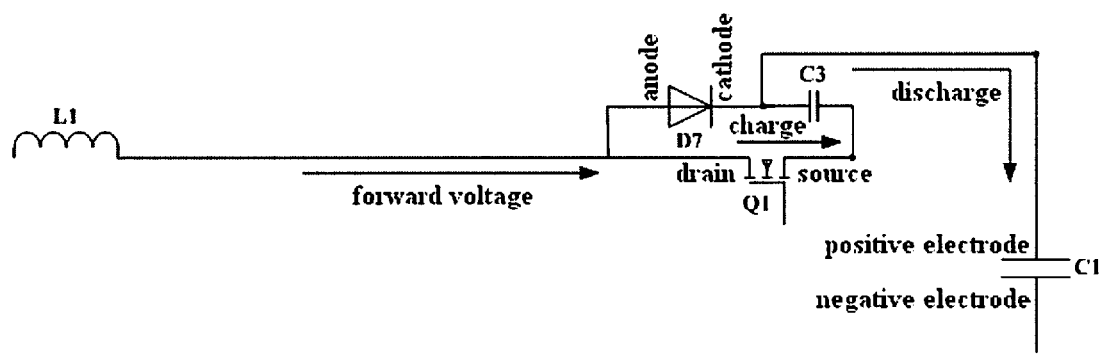
FIG. 3 is a schematic view of an operation method of a lossless snubber circuit.

FIG. 3 is a schematic view of an operation method of the lossless snubber circuit. As shown in FIG. 3, in the case where an input voltage is a forward voltage and the anode of the first diode D7 in the first snubber circuit is connected to the drain of the switch transistor Q1, the operation method of the lossless snubber circuit is as follow:

if the switch transistor Q1 is off and the first diode D7 in the first snubber circuit is on, then the capacitor C3 in the first snubber circuit is charged; and if the switch transistor Q1 is on and the first diode D7 in the first snubber circuit is off, then the electric charges released by the capacitor C3 in the first snubber circuit flow to a first capacitor C1 in a three-phase Vienna structure.

When the current flows via the inductor L1 into the circuit for the phase of the three-phase Vienna structure where the switch transistor Q1 is located, it is determined that the drain of the switch transistor Q1 has a high potential and the source of the switch transistor Q1 has a low potential, i.e. the voltage currently input is a forward voltage.

If the switch transistor Q1 is off, theoretically the voltage spike generated by the switch transistor Q1 may be transmitted to the first capacitor C1 in the three-phase Vienna structure through the path between the first diode D7 in the first snubber circuit and the first capacitor C1 in the three-phase Vienna structure. However, according to the principle of capacitor proximity in a circuit, in the circuit connection shown in FIG. 2(a), the distance between the capacitor C3 in the first snubber circuit and the switch transistor Q1 is shorter than the distance between the first capacitor C1 in the three-phase Vienna structure and the switch transistor Q1. Therefore, the capacitor C3 in the first snubber circuit is charged via the first diode D7 in the first snubber circuit.

If the switch transistor Q1 is on, the capacitor C3 in the first snubber circuit has absorbed the voltage spike generated at the moment when the switch transistor Q1 is turned off, therefore, when the switch transistor Q1 is on, the resistance of the first diode D7 in the first snubber circuit is larger than the on resistance of the switch transistor Q1, so that the first diode D7 in the first snubber circuit is not on and serves as an open circuit in the circuit. The electric charges released by the capacitor C3 in the first snubber circuit will flow to the first capacitor C1 in the three-phase Vienna structure through the path between the capacitor C3 in the first snubber circuit and the first capacitor C1 in the three-phase Vienna structure.

Second Case

The lossless snubber circuit includes a first snubber circuit and a second snubber circuit. The first snubber circuit includes a first diode D7 and a capacitor C3 which are connected in a way same as that in the first snubber circuit shown in FIG. 2(a). The second snubber circuit includes a first diode D9 and a capacitor C4 which are connected in a way same as that in the first snubber circuit shown in FIG. 2(a).

The capacitance of the capacitor C4 in the second snubber circuit is smaller than the capacitance of the capacitor C2 in the three-phase Vienna structure.

The capacitance of the capacitor C4 in the second snubber circuit may be determined according to the voltage spike generated at the moment when the switch transistor Q1 is turned off, or may be determined as required, which is not limited thereto.

Figure 4:
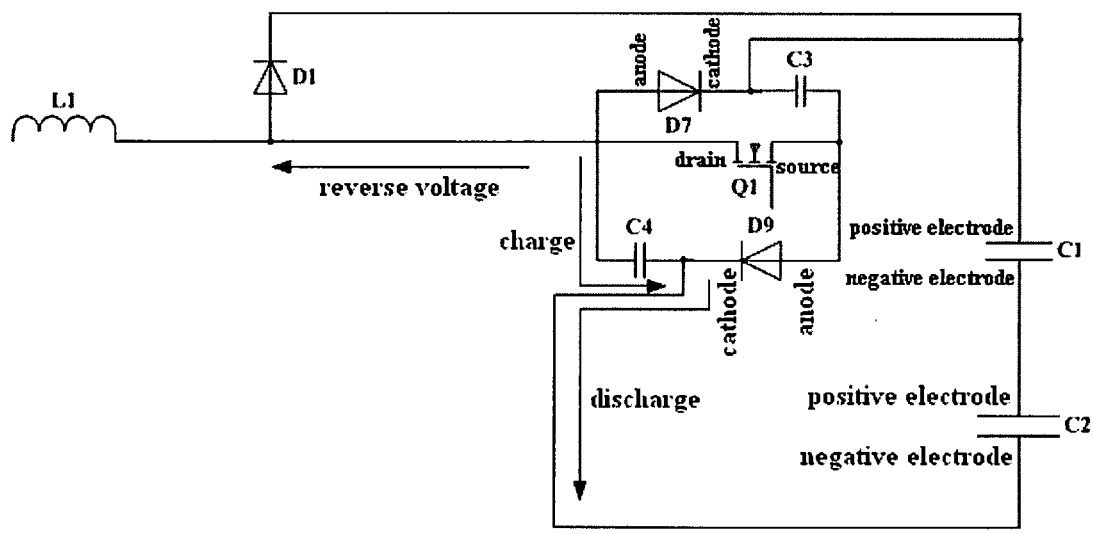
FIG. 4 is a schematic view of an operation method of a lossless snubber circuit.

FIG. 4 is a schematic view of an operation method of the lossless snubber circuit. As shown in FIG. 4, in the case where the input voltage is a reverse voltage, the anode of the first diode D7 in the first snubber circuit is connected to the drain of the switch transistor Q1, and the anode of the first diode D9 in the second snubber circuit is connected to the source of the switch transistor Q1, the operation method of the lossless snubber circuit is as follow:

if the switch transistor Q1 is off and the first diode D9 in the second snubber circuit is on, then a capacitor C4 in the second snubber circuit is charged; and if the switch transistor Q1 is on and the first diode D9 in the second snubber circuit is off, the electric charges released by the capacitor C4 in the second snubber circuit flow to a second capacitor C2 in the three-phase Vienna structure.

When the switch transistor Q1 is off, theoretically the voltage spike generated by the switch transistor Q1 may be transmitted to second capacitor C2 in the three-phase Vienna structure through the path between the first diode D9 in the second snubber circuit and the second capacitor C2 in the three-phase Vienna structure. However, according to principle of capacitor proximity in a circuit, in the circuit connection shown in FIG. 2(a), the distance between the capacitor C4 in the second snubber circuit and the switch transistor Q1 is shorter than the distance between the second capacitor C2 in the three-phase Vienna structure and the switch transistor Q1. Therefore, the capacitor C4 in the second snubber circuit is charged via the first diode D9 in the second snubber circuit.

If the switch transistor Q1 is on, the capacitor C4 in the second snubber circuit has absorbed the voltage spike generated at the moment when the switch transistor Q1 is turned off, therefore, when the switch transistor Q1 is on, the on resistance of the first diode D9 in the second snubber circuit is larger than the on resistance of the switch transistor Q1, so that the first diode D9 in the second snubber circuit is not on and serves as an open circuit in the circuit. The electric charges released by capacitor C4 in the second snubber circuit will flow to the second capacitor C2 in the three-phase Vienna structure through the path between the capacitor C4 in the second snubber circuit and the second capacitor C2 in the three-phase Vienna structure.

When the current flows via the inductor L1 out of the circuit for the phase of the three-phase Vienna structure where the switch transistor Q1 is located, it is determined that the drain of the switch transistor Q1 has a low potential and the source of the switch transistor Q1 has a high potential, i.e. the voltage currently input is a reverse voltage.

Third Case

The lossless snubber circuit includes a first snubber circuit. The first snubber circuit includes a first diode D7, a second diode D8 and a capacitor C3 which are connected in a way same as that in the first snubber circuit shown in FIG. 2(b).

The capacitance of the capacitor C3 is smaller than the capacitance of the first capacitor C1 in the three-phase Vienna structure.

The capacitance of the capacitor C3 in the first snubber circuit may be determined according to the voltage spike generated at the moment when the switch transistor Q1 is turned off, or may be determined as required, which is not limited thereto.

Figure 5:
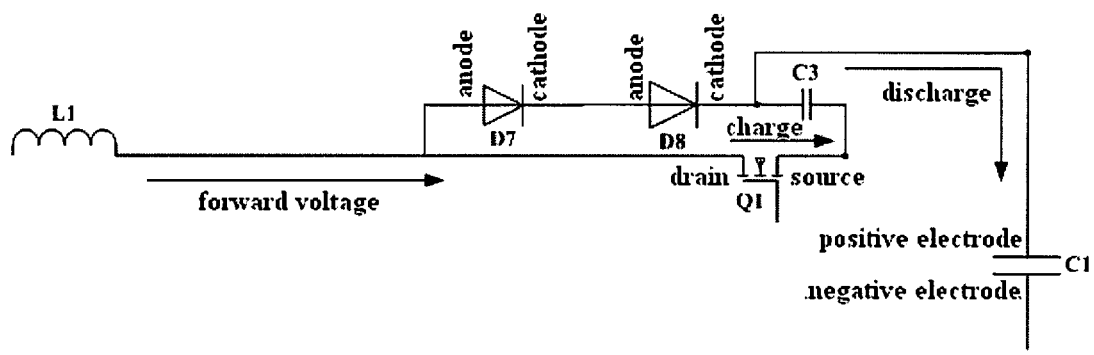
FIG. 5 is a schematic view of an operation method of a lossless snubber circuit.

FIG. 5 is a schematic view of an operation method of the lossless snubber circuit. As shown in FIG. 5, in the case where the input voltage is the forward voltage and the anode of the first diode D7 in the first snubber circuit is connected to the drain of the switch transistor Q1, the cathode of the first diode D7 in the first snubber circuit is connected to the anode of a second diode D8 in the first snubber circuit, the operation method of the lossless snubber circuit is as follow:

if the switch transistor Q1 is off and the first diode D7 in the first snubber circuit and the second diode D8 in the first snubber circuit are on, then the capacitor C3 in the first snubber circuit is charged; and if the switch transistor Q1 is on and the first diode D7 in the first snubber circuit and the second diode D8 in the first snubber circuit are off, then the electric charges released by the capacitor C3 in the first snubber circuit flow to the first capacitor C1 in the three-phase Vienna structure.

Fourth Case

The lossless snubber circuit includes a first snubber circuit and a second snubber circuit. The first snubber circuit includes a first diode D7, a second diode D8 and a capacitor C3 which are connected in a way same as that in the first snubber circuit shown in FIG. 2(b). The second snubber circuit includes a first diode D9, a second diode D10 and a capacitor C4 which are connected in a way same as that in the first snubber circuit shown in FIG. 2(b).

The capacitance of the capacitor C4 in the second snubber circuit is smaller than the capacitance of the capacitor C2 in the three-phase Vienna structure.

The capacitance of the capacitor C4 in the second snubber circuit may be determined according to the voltage spike generated at the moment when the switch transistor Q1 is turned off, or may be determined as required, which is not limited thereto.

Figure 6:
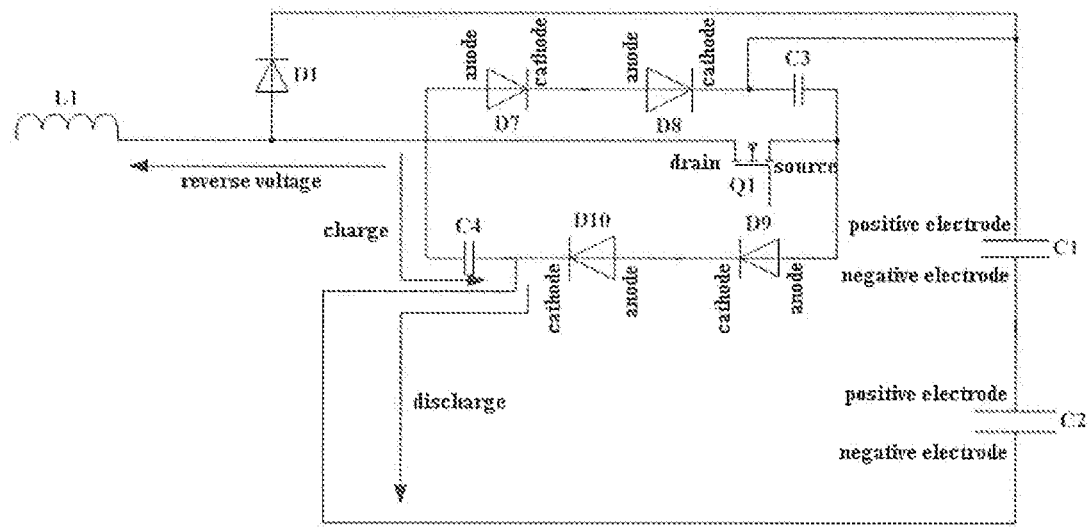
FIG. 6 is a schematic view of an operation method of a lossless snubber circuit.

FIG. 6 is a schematic view of an operation method of the lossless snubber circuit. As shown in FIG. 6, in the case where the input voltage is the reverse voltage, the anode of the first diode D7 in the first snubber circuit is connected to the drain of the switch transistor Q1, the anode of the first diode D9 in the second snubber circuit is connected to the sourse of the switch transistor Q1, and the cathode of the first diode D9 in the second snubber circuit is connected to an anode of the second diode D10 in the second snubber circuit, the operation method of the lossless snubber circuit includes:

if the switch transistor Q1 is off and the first diode D9 in the second snubber circuit and the second diode D10 in the second snubber circuit are on, then the capacitor C4 in the second snubber circuit is charged; and if the switch transistor Q1 is on and the first diode D9 in the second snubber circuit and the second diode D10 in the second snubber circuit are off, then the electric charges released by the capacitor C4 in the second snubber circuit flow to the second capacitor C2 in the three-phase Vienna structure.

By means of the structure of the lossless snubber circuit according to the first embodiment and the operation method of the lossless snubber circuit according to the second embodiment, in the case where the input voltage is a forward voltage, if the switch transistor Q1 is off, the capacitor C3 is charged via the first diode D7 in the first snubber circuit. In charging the capacitor C3, since the capacitance of the capacitor C3 in the invention may be determined as required, therefore, when the capacitance of the capacitor C3 is big enough, the quantity of the electric charges that can be absorbed by the capacitor C3 is increased correspondingly, so that the voltage spike generated at the moment when the switch transistor Q1 is turned off can be effectively depressed. Meanwhile, if the switch transistor Q1 is on, the voltage of the capacitor C3 is higher than the voltage of the drain of the switch transistor Q1, so that the first diode D7 in the first snubber circuit is shorted, and the electric charges released by the capacitor C3 flow to the capacitor C1, avoiding the problem of voltage stress difference caused by the large quantity of electric charges released by the capacitor C3 flowing back to the switch transistor Q1, and reducing the power consumption of the devices in the entire circuit. In the case where the input voltage is the reverse voltage, if the switch transistor Q1 is off, the capacitor C4 is charged via the first diode D9 in the second snubber circuit, if the switch transistor Q1 is on, the electric charges released by the capacitor C4 flow to the capacitor C2, achieving the same effect as that when the input voltage is a forward voltage.

Third Embodiment

A lossless snubber circuit is included in a three-phase Vienna structure. The lossless snubber circuit includes a first snubber circuit and a second snubber circuit. The first snubber circuit includes a first diode D7 and a capacitor C3. The second snubber circuit includes a second diode D9 and a capacitor C4.

In the lossless snubber circuit, the anode of the first diode D7 in the first snubber circuit is connected to the drain of the switch transistor Q1. The cathode of the first diode D7 is connected to one terminal of the capacitor C3. The other terminal of the capacitor C3 in is connected to the source of the switch transistor Q1. The connection point between the cathode of the first diode D7 and one terminal of the capacitor C3 is connected to the positive electrode of the capacitor C1 in the three-phase Vienna structure.

In the lossless snubber circuit, the anode of the first diode D9 in the second snubber circuit is connected to the source of the switch transistor Q1. The cathode of the first diode D9 is connected to one terminal of the capacitor C4. The other terminal of the capacitor C4 in is connected to the drain of the switch transistor Q1. The connection point between the cathode of the first diode D9 and one terminal of the capacitor C4 is connected to the negative electrode of the capacitor C2 in the three-phase Vienna structure.

The method includes:
in the case where the input voltage is a forward voltage,
the operation states of the first diode D7 in the first snubber circuit and the first diode D9 in the second snubber circuit are determined,
in the case that the first diode D7 in the first snubber circuit is on and the first diode D9 in the second snubber circuit is off, if the switch transistor Q1 is off, the first diode D7 in the first snubber circuit is on, then the capacitor C3 in the first snubber circuit is charged; and
if the switch transistor Q1 is on and the first diode D7 in the first snubber circuit is off, the electric charges released by the capacitor C3 in the first snubber circuit flow to the second capacitor C1 in the three-phase Vienna structure.

In the case where the input voltage is a reverse voltage,
the operation states of the first diode D7 in the first snubber circuit and the first diode D9 in the second snubber circuit are determined,
in the case that the first diode D7 in the first snubber circuit is on and the first diode D9 in the second snubber circuit is off, if the switch transistor Q1 is off, the first diode D9 in the second snubber circuit is on, then the capacitor C4 in the second snubber circuit is charged;
if the switch transistor Q1 is on and the first diode D9 in the second snubber circuit is off, the electric charges released by the capacitor C4 in the second snubber circuit flow to the second capacitor C2 in the three-phase Vienna structure.

Figure 7:
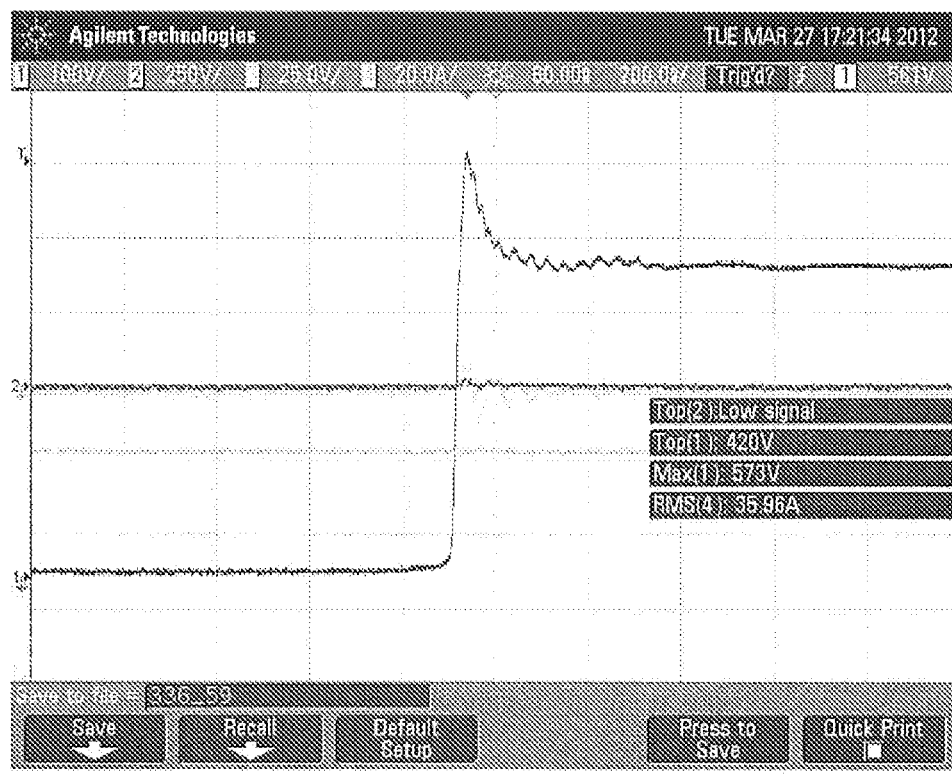
FIG. 7 is a waveform diagram of a voltage across the drain and the source of a switch transistor Q1 measured with a RC snubber circuit in the prior art when the switch transistor Q1 is turned off.

FIG. 7 is a waveform diagram of the voltage between the drain and the source of a switch transistor Q1 measured with a RC snubber circuit in the prior art when the switch transistor Q1 is turned off. As shown in FIG. 7, with the RC snubber circuit, the voltage spike between the drain and the source of the switch transistor Q1 when the switch transistor Q1 is turned off is up to 573V.

Figure 8:
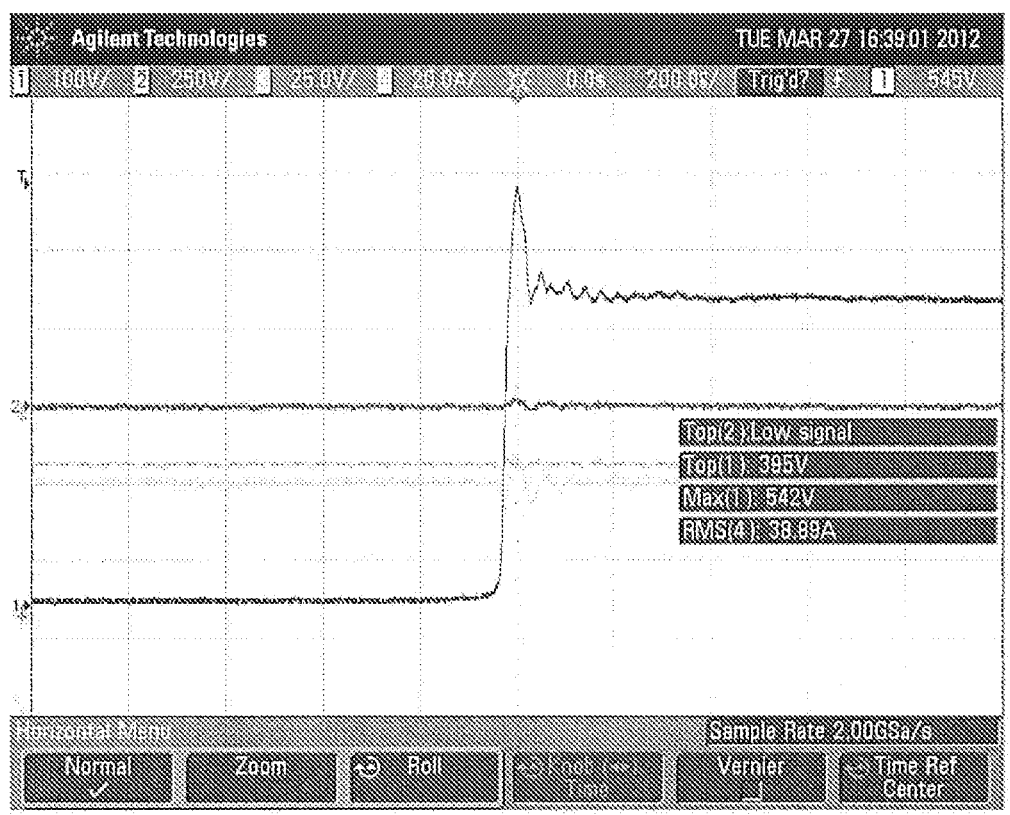
FIG. 8 is a waveform diagram of a voltage across the drain and the source of a switch transistor Q1 measured with a lossless snubber circuit according to the invention when the switch transistor Q1 is turned off.

FIG. 8 is a waveform diagram of the voltage between the drain and the source of a switch transistor Q1 measured with a lossless snubber circuit according to the invention when the switch transistor Q1 is turned off. As shown in FIG. 8, with the lossless snubber circuit, the voltage spike between the drain and the source of the switch transistor Q1 when the switch transistor Q1 is turned off is up to 542V. Therefore, the lossless snubber circuit effectively depresses the voltage spike between the drain and the source of the switch transistor Q1 when the switch transistor Q1 is turned off.

It should be noted that, the switch transistors in the circuits for the other two phases of the three-phase Vienna structure are both provided with the above-mentioned lossless snubber circuits, the connections thereof are the same as above, the operation method of the lossless snubber circuit for each phase is the same, which will not be further described in detail.

It is apparent that numerous modifications and alternations can be made to the present invention by those skilled in the art without deviation from the spirit and scope of the present invention. Therefore, the present invention intends to include the modifications and alternations made to the present invention, provided that the modifications and alternations belong to the scope of the claims of the present invention and the equivalents thereof.

The invention claimed is:

1. A lossless snubber circuit connected to a circuit for one phase in a three-phase Vienna structure, the three-phase Vienna structure including a first capacitor and a second capacitor coupled to the first capacitor, the circuit for one phase in the three-phase Vienna structure including a first diode coupled to the first capacitor and a second diode coupled to the second capacitor, the lossless snubber circuit comprising a first snubber circuit and a second snubber circuit, wherein:
the anode of a first diode in the first snubber circuit is connected to the drain of a switch transistor, and one terminal of a capacitor in the first snubber circuit is connected to the source of the switch transistor;
the cathode of the first diode in the first snubber circuit is connected to the other terminal of the capacitor in the first snubber circuit, the connection point between the cathode of the first diode in the first snubber circuit and the capacitor in the first snubber circuit is connected to the positive electrode of the first capacitor in the three-phase Vienna structure; and
a first diode in the second snubber circuit diode and a capacitor in the second snubber circuit are coupled between the drain and the source of the switch transistor, a connection point between the capacitor in the second snubber circuit and a cathode of the first diode in the second snubber circuit connected to the negative electrode of the second capacitor in the three-phase Vienna structure.

2. The lossless snubber circuit according to claim 1, wherein:
the anode of the first diode in the second snubber circuit is connected to the source of the switch transistor, and one terminal of the capacitor in the second snubber circuit is connected to the drain of the switch transistor; and
the positive electrode of the second capacitor in the three-phase Vienna structure is connected to the negative electrode of the first capacitor in the three-phase Vienna structure.

3. The lossless snubber circuit according to claim 2, wherein the first snubber circuit further comprises a second diode in the first snubber circuit, wherein:
the second diode in the first snubber circuit and the first diode in the first snubber circuit are connected in series and have the same forward direction, and the second diode is connected in the first snubber circuit at a position between the drain of the switch transistor and the connection point between the first diode in the first snubber circuit and the capacitor in the first snubber circuit.

4. The lossless snubber circuit according to claim 3, wherein the second snubber circuit further comprises a second diode in the second snubber circuit, wherein:
the second diode in the second snubber circuit and the first diode in the second snubber circuit are connected in series and have the same forward direction, and the second diode is connected in the second snubber circuit at a position between the source of the switch transistor and the connection point between the first diode in the second snubber circuit and the capacitor in the second snubber circuit.

5. The lossless snubber circuit according to claim 4, wherein:
the cathode of the first diode in the first snubber circuit is connected to the anode of the second diode in the first snubber circuit, the cathode of the second diode in the first snubber circuit is connected to one terminal of the capacitor in the first snubber circuit, the other terminal of the capacitor in the first snubber circuit is connected to the source of the switch transistor, the cathode of the first diode in the second snubber circuit is connected to the anode of the second diode in the second snubber circuit, the cathode of the second diode in the second snubber circuit is connected to one terminal of the capacitor in the second snubber circuit, and the other terminal of the capacitor in the second snubber circuit is connected to the drain of the switch transistor.

6. An operation method of a lossless snubber circuit connected to a circuit for one phase in a three-phase Vienna structure, the three-phase Vienna structure including a first capacitor and a second capacitor coupled to the first capacitor, the circuit for one phase in the three-phase Vienna structure including a first diode coupled to the first capacitor, a second diode coupled to the second capacitor, a switch transistor, a first snubber circuit and a second snubber circuit, the first snubber circuit having a first diode coupled with a capacitor, the anode of the first diode in the first snubber circuit connected to a drain of the switch transistor, the second snubber circuit having a first diode coupled with a capacitor, the anode of the first diode in the second snubber circuit connected to the drain of the switch transistor, the method comprising:

when an input voltage is a forward voltage, if the switch transistor is off and the first diode in the first snubber circuit is on, then the capacitor in the first snubber circuit is charged;
if the switch transistor is on and the first diode in the first snubber circuit is off, then electric charges released from the capacitor in the first snubber circuit flow to the first capacitor in the three-phase Vienna structure; and
if the switch transistor is on and the first diode in the second snubber circuit is off, then electric charges released from the capacitor in the second snubber circuit flow to the second capacitor in the three-phase Vienna structure.

7. The method according to claim 6, further comprising:
when the input voltage is a reverse voltage, if the switch transistor is off and the first diode in the second snubber circuit is on, then a capacitor in the second snubber circuit is charged.

8. The method according to claim 7, wherein a cathode of the first diode in the first snubber circuit is connected to the anode of a second diode in the first snubber circuit, the method further comprising:
when the input voltage is a forward voltage, if the switch transistor is off and the first diode in the first snubber circuit and the second diode in the first snubber circuit are on, then the capacitor in the first snubber circuit is charged; and
if the switch transistor is on and the first diode in the first snubber circuit and the second diode in the first snubber circuit are off, then electric charges released from the capacitor in the first snubber circuit flow to the first capacitor in the three-phase Vienna structure.

9. The method according to claim 8, wherein a cathode of the first diode in the second snubber circuit is connected to the anode of a second diode in the second snubber circuit, the method further comprising:
when the input voltage is a reverse voltage, if the switch transistor is off and the first diode in the second snubber circuit and the second diode in the second snubber circuit are on, then the capacitor in the second snubber circuit is charged; and
if the switch transistor is on and the first diode in the second snubber circuit and the second diode in the second snubber circuit are off, then electric charges released from the capacitor in the second snubber circuit flow to the second capacitor in the three-phase Vienna structure.

10. The lossless snubber circuit according to claim 2, wherein a circuit for a second phase in the three-phase Vienna structure includes a third diode coupled to the first capacitor of the three-phase Vienna structure and a fourth diode coupled to the second capacitor of the three-phase Vienna structure, the first snubber circuit further comprises a second diode in the first snubber circuit, the second diode in the first snubber circuit and the first diode in the first snubber circuit are connected in series and have the same forward direction, and the second diode is connected in the first snubber circuit at a position between the drain of the switch transistor and the connection point between the first diode in the first snubber circuit and the capacitor in the first snubber circuit.

11. The lossless snubber circuit according to claim 10, wherein the second snubber circuit further comprises a second diode in the second snubber circuit, the second diode in the second snubber circuit and the first diode in the second snubber circuit are connected in series and have the same forward direction, and the second diode is connected in the second snubber circuit at a position between the source of the switch transistor and the connection point between the first diode in the second snubber circuit and the capacitor in the second snubber circuit.

12. The lossless snubber circuit according to claim 11, wherein the cathode of the first diode in the first snubber circuit is connected to the anode of the second diode in the first snubber circuit, the cathode of the second diode in the first snubber circuit is connected to one terminal of the capacitor in the first snubber circuit, the other terminal of the capacitor in the first snubber circuit is connected to the source of the switch transistor, the cathode of the first diode in the second snubber circuit is connected to the anode of the second diode in the second snubber circuit, the cathode of the second diode in the second snubber circuit is connected to one terminal of the capacitor in the second snubber circuit, and the other terminal of the capacitor in the second snubber circuit is connected to the drain of the switch transistor.

13. The method according to claim 7, wherein a circuit for a second phase in the three-phase Vienna structure includes a third diode coupled to the first capacitor of the three-phase Vienna structure and a fourth diode coupled to the second capacitor of the three-phase Vienna structure, and a cathode of the first diode in the first snubber circuit is connected to the anode of a second diode in the first snubber circuit, the method further comprising:
when the input voltage is a forward voltage, if the switch transistor is off and the first diode in the first snubber circuit and the second diode in the first snubber circuit are on, then the capacitor in the first snubber circuit is charged; and
if the switch transistor is on and the first diode in the first snubber circuit and the second diode in the first snubber circuit are off, then electric charges released from the capacitor in the first snubber circuit flow to the first capacitor in the three-phase Vienna structure.

14. The method according to claim 13, wherein a cathode of the first diode in the second snubber circuit is connected to the anode of a second diode in the second snubber circuit, the method further comprising:
when the input voltage is a reverse voltage, if the switch transistor is off and the first diode in the second snubber circuit and the second diode in the second snubber circuit are on, then the capacitor in the second snubber circuit is charged; and
if the switch transistor is on and the first diode in the second snubber circuit and the second diode in the second snubber circuit are off, then electric charges released from the capacitor in the second snubber circuit flow to the second capacitor in the three-phase Vienna structure.

15. The lossless snubber circuit of claim 1, wherein:
the anode of the first diode in the first snubber circuit is connected to a connection point between the first diode and the second diode in the three-phase Vienna structure; and
the one terminal of the capacitor in the first snubber circuit is connected to a connection point between a negative electrode of the first capacitor in the three-phase Vienna structure and a positive electrode of the second capacitor in the three-phase Vienna structure.

16. A circuit comprising:
at least one phase circuit of a three-phase Vienna structure, the phase circuit having a first capacitor, a second capacitor coupled to the first capacitor, a first diode coupled to the first capacitor, a second diode coupled to the second capacitor, and a switch transistor coupled to a connection point between the first capacitor and the second capacitor;
a first lossless snubber circuit coupled in parallel with the switch transistor, the first lossless snubber circuit having a snubber circuit diode coupled with a snubber circuit capacitor, wherein a connection point between the snubber circuit diode and the snubber circuit capacitor of the first lossless snubber circuit is coupled to the first capacitor of the phase circuit; and
a second lossless snubber circuit coupled in parallel with the switch transistor, the second lossless snubber circuit having a snubber circuit diode coupled with a snubber circuit capacitor, wherein a connection point between the snubber circuit diode and the snubber circuit capacitor of the second lossless snubber circuit is coupled to the second capacitor of the phase circuit.

17. The circuit of claim 16, wherein the snubber circuit diode is a first snubber circuit diode, and the lossless snubber circuit further includes a second snubber circuit diode coupled in series with the first snubber circuit diode and the snubber circuit capacitor.

18. The circuit of claim 16, wherein the snubber circuit diode of the second lossless snubber circuit is a first snubber circuit diode, and the second lossless snubber circuit further includes a second snubber circuit diode coupled in series with the first snubber circuit diode and the snubber circuit capacitor of the second lossless snubber circuit.

19. The circuit of claim 16, wherein the connection point of the first lossless snubber circuit is coupled to the first capacitor of the one phase circuit at a side of the first capacitor opposite the second capacitor of the phase circuit, and the connection point of the second lossless snubber circuit is coupled to the second capacitor of the one phase circuit at a side of the second capacitor opposite the first capacitor of the phase circuit.

* * * * *